(12) United States Patent
Welter

(10) Patent No.: US 6,435,593 B2
(45) Date of Patent: Aug. 20, 2002

(54) VISOR FOR VEHICLES

(75) Inventor: Patrick Welter, La Chambre (FR)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/827,261

(22) Filed: Apr. 5, 2001

(30) Foreign Application Priority Data

Apr. 5, 2000 (DE) .......................................... 100 17 046

(51) Int. Cl.$^7$ ................................................. B60J 3/02
(52) U.S. Cl. ..................... 296/97.5; 296/97.11; 362/492
(58) Field of Search ........................... 296/97.11, 97.12, 296/97.5, 97.9, 97.8; 362/492

(56) References Cited

U.S. PATENT DOCUMENTS

| 5,720,509 A | 2/1998 | Binish |
| 5,810,420 A | 9/1998 | Welling |
| 6,174,019 B1 * | 1/2001 | Collet et al. ............. 296/97.11 |

FOREIGN PATENT DOCUMENTS

| DE | 43 28 890 C1 | 8/1993 |
| DE | 297 09 454 U1 | 7/1997 |
| EP | 0 374 582 A | 6/1990 |
| WO | WO 98 57216 A | 12/1998 |

* cited by examiner

*Primary Examiner*—Joseph D. Pape
(74) *Attorney, Agent, or Firm*—Price, Heneveld, Cooper, DeWitt & Litton

(57) ABSTRACT

This publication describes a visor for vehicles whose visor body can be folded around an associated axle and can be shifted along said axle. The following is provided here: The visor body is equipped with at least one switching device for the purpose of turning on and turning off an electrical illumination device, a remote-control unit for the purpose of controlling an automatic device for opening and closing garage doors or the like as well as a line comprising several conductor wires where, via line that can be connected with the general electrical system of the vehicle, there is provided a power supply that is permanent and that is independent of the particular position of the visor for at least one switching device that is electrically connected to line as well as with remote-control unit that is likewise electrically connected to line.

8 Claims, 3 Drawing Sheets

VISOR FOR VEHICLES

BACKGROUND OF THE INVENTION

This invention relates to a visor of the kind described in greater detail in the preamble of claim 1 such as it was disclosed, for example, by EP 0 231 440 B1 or 499 020 B1.

The above-mentioned visors proved exceptionally well in practice, especially since compared to conventional visors, they offer a considerably improved protection against light with visor units that cannot be shifted along the axle. On the other hand, the visors shown in the above-mentioned publications no longer meet present-day requirements of customers who demand that the visors provide supplementary functions.

SUMMARY OF THE INVENTION

To meet these requirements starting with a visor of the kind mentioned initially and in accordance with the invention, there is presented one which is distinguished by the fact that the body of the visor is equipped with a switching device for turning on and turning off an electrical illumination device, a remote-control unit for controlling an automatic device for opening and closing garage doors or the like. The visor includes a line that comprises conductor wires connected via the general electrical system of the vehicle to provide a permanent power supply, independent of the position of the visor body, for the independent power supply of at least one switching device that is electrically connected with the line as well as connected with the line of the electrically connected remote-control unit.

The invention-based visor can, in the usual manner, be folded from a position in which it rests against the ceiling canopy of a vehicle into a user position in front of a vehicle windshield and can additionally be swung to a side window of the vehicle. In both conditions, the body of the visor can be shifted along its axle and there is one special feature which consists of the following: It is equipped with at least one switching device for turning on an turning off an electrical illumination device, a remote-control unit and an electrical line that ensures a power supply, when in the resting position, in the user position and in any desired shifting position of the body of the visor along the axle. The illumination device that cooperates with the switching device can be housed in the visor body, for example, as a part of a mirror subassembly, but it can also be arranged externally, for example, in the ceiling canopy of a vehicle in order, for example, so that one may be able to use a mirror arranged in the body of the visor in the dark.

The remote-control unit, arranged in the body of the visor according to the invention, which is in itself part of the state of the art, and can serve for the control of several automatic devices for opening and closing several garage doors, parking lot barriers, doors of private dwellings and the like and can be equipped with a corresponding number of switches. The number of conductor wires of the line depends on the number of the switches to be provided.

The requirement for a permanent power supply for the remote-control unit in the slidable visor is advantageously met in the following manner: The line has an excessive length corresponding to the maximum shifting distance of the body of the visor, such that there is always line available when that the body of the visor is shifted from its normal position.

A particularly advantageous development of the invention provides for the following: The extra length of the line is housed inside the body of the visor. In this manner, one can also meet aesthetic requirements. Building on another advantageous development of the invention, it is provided that the line that is connected to at least one switching device and the remote-control unit, on the one hand, runs through the axle, which is made hollow, and on the other hand, is returned in order to run inside the tube-shaped tube body around the axle in loose windings where the surplus length of the line is defined by the cross-section of the windings.

It is furthermore provided that the sliding body has a recess on the bottom side for the cable duct of the line and bears a switch whose switching member is supported on the axle. The diversion of the line is made easier by virtue of the cable duct and, in particular, one can make sure that the sliding body can slide unhindered through the cavity. The switch arranged on the sliding body is provided in order to disconnect the power supply for the illumination unit when the body of the visor is in its resting position, at which time it rests against the ceiling canopy.

The following is recommended to simplify the production of the visor: The conductor wires, provided in the remote control unit of the line, be electrically connected with a coupling element arranged in the body of the visor capable of being coupled, in turn, with the remote-control unit. The coupling member can be a commercially available part.

The following can furthermore be provided in a practical manner: The axle is preassembled with a sliding body, a multi-wire line, a cavity, a switching device and a coupling element, which form a structural subassembly featuring a pre-assembled frame structure for the purpose of stiffening the body of the visor, supplemented with plug elements engaging the cavity. This structural subassembly can then be foamed, or as is provided in a preferred manner, it can be arranged between the halves of a visor body that is made up in the form of two cups.

An exemplary embodiment of the invention will be explained in greater detail below, referring to the attached drawings.

DETAILED DESCRIPTION OF THE PREFERRED EMBODIMENT

Figure 1:
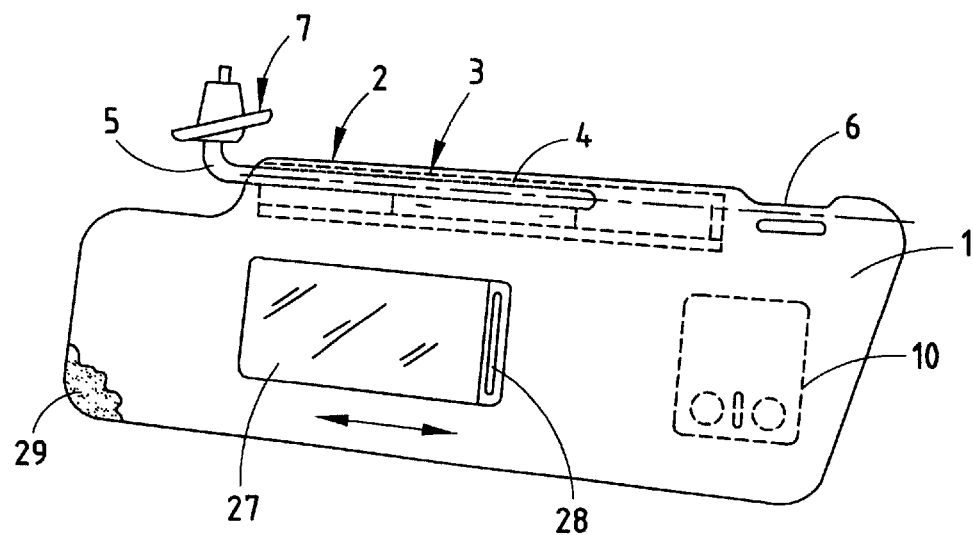
FIG. 1 is an overall view of the visor.

The visor according to FIG. 1 consists of a visor body 1 that along its upper longitudinal edge 2 bears a tube-shaped body 3 which is embedded therein in which is slidably received a sliding body 4 that can be slid in an axial manner and that rests on an axle 5. The visor furthermore has a bearing pin 6 for the purpose of engaging a thrust bearing not shown. Axle 5 is L-shaped and its longer leg is received by sliding body 4, while the shorter leg is received by a little drag bearing trestle 7. The body of visor 1 is usually arranged on the long leg of the axle 5 in the position seen in FIG. 1. So that the driver and the passenger of a vehicle can be protected against incident sun rays or other light rays, the visor body 1 is attached above the windshield to the vehicle body and can be folded before the windshield or can be swung to a side windowpane. Moreover, there is provided a movable arrangement indicated by the double arrow of the body of visor 1 on the long leg of axle 5. To that extent, the new visor essentially corresponds to the structure of the visor according to EP 0 499 020 B1 so that details of sliding body 4 with press-on element 8 and the catch and shifting mechanism need not be explained in any further detail.

Figure 4:
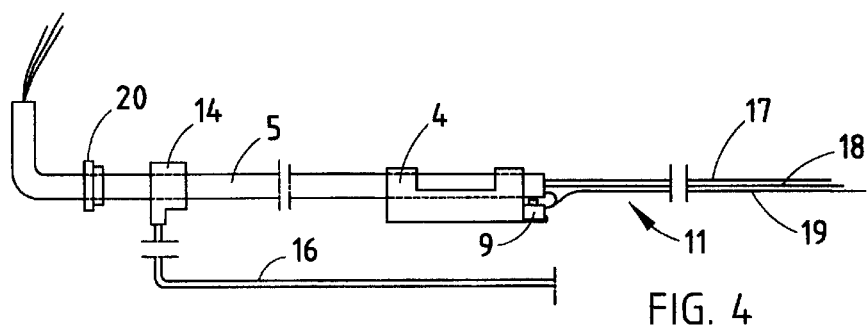
Figure 5:
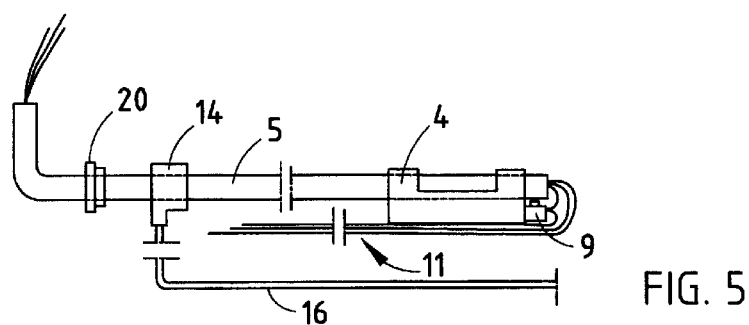
Figure 6:
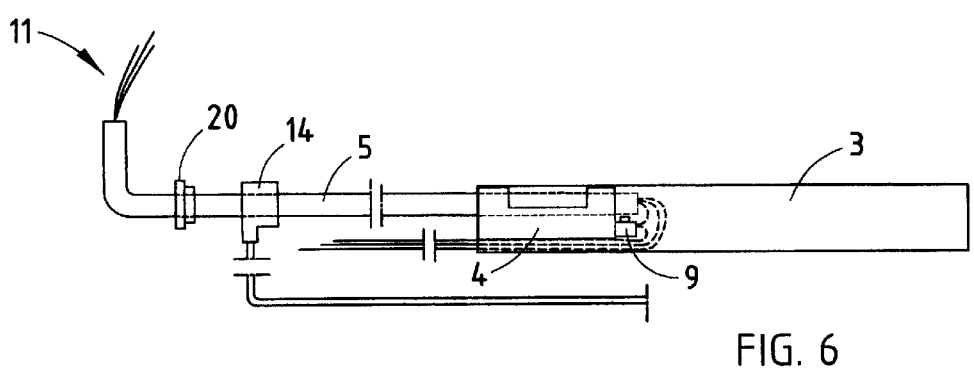
Figure 7:
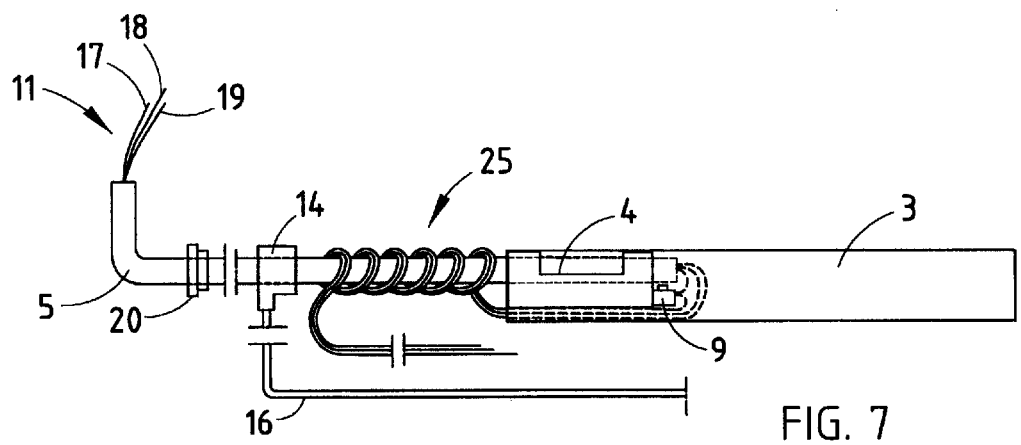

The new visor, moreover, has a switching device arranged in the body of visor 1 with switch 9 (FIGS. 4–7), a remote-control unit 10 and a line 11 comprising several conductor wires, such as 17, 18, and 19 (FIG. 4).

Figure 2:
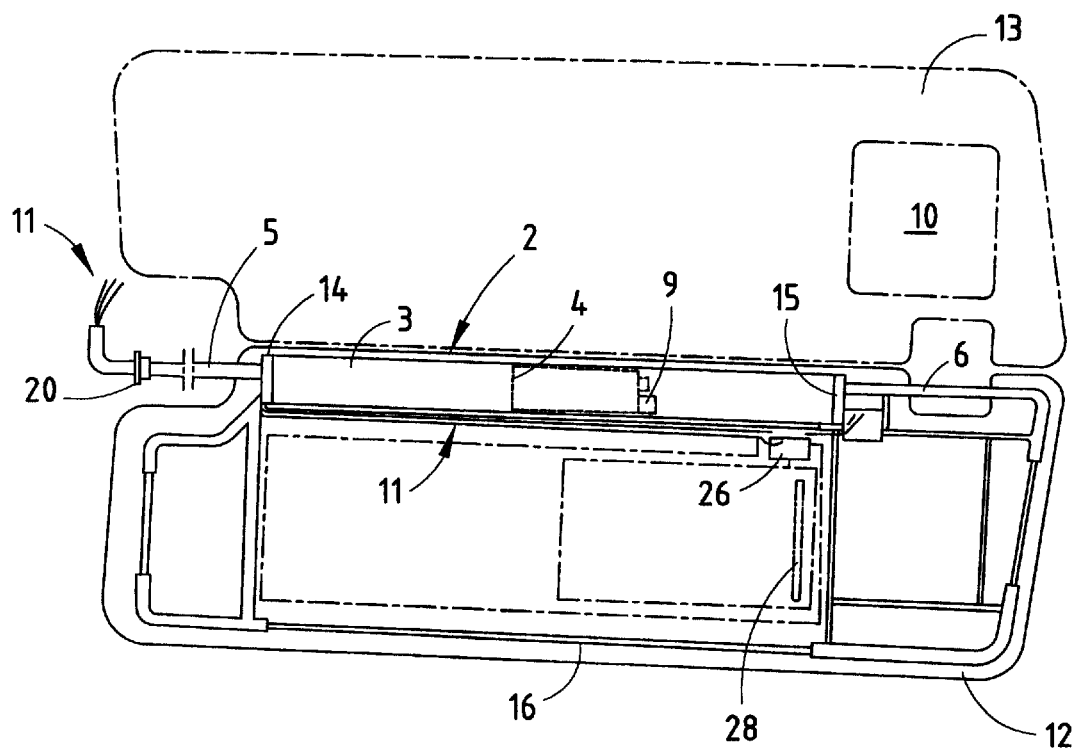
FIG. 2 shows a cutaway top view of the visor body made of two cups of the visor according to FIG. 1.

As one can see in FIG. 2, visor body 1 is built in the form of two cups. The cup halves 12, 13 can, for example, consist of foamed or sprayed foam substance. After the cup halves 12, 13 have been assembled, the body of visor 1, as a rule, is also given an envelope made of, for instance, textile decorator material. Between cup halves 12, there are the functional elements of the visor which for the most part were mentioned earlier. FIG. 2 shows that terminal plug 14 and plug 15 adjoin cavity 3, and are part of a frame structure 16 that is used to stiffen the body of the visor and that can consist of synthetic injection molded parts and wire segments connected therewith. In terminal plugs 14, there are passage openings—not shown in any greater detail—for the line 11, and in terminal plug 14, there is also a passage opening for axle 5.

Figure 3:
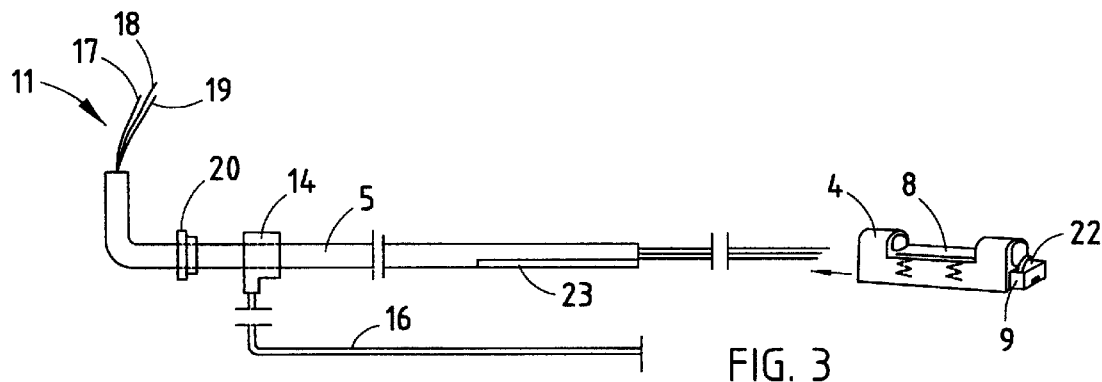
FIGS. 3–9 show details of the visor and the assembly sequence.
Figure 8:
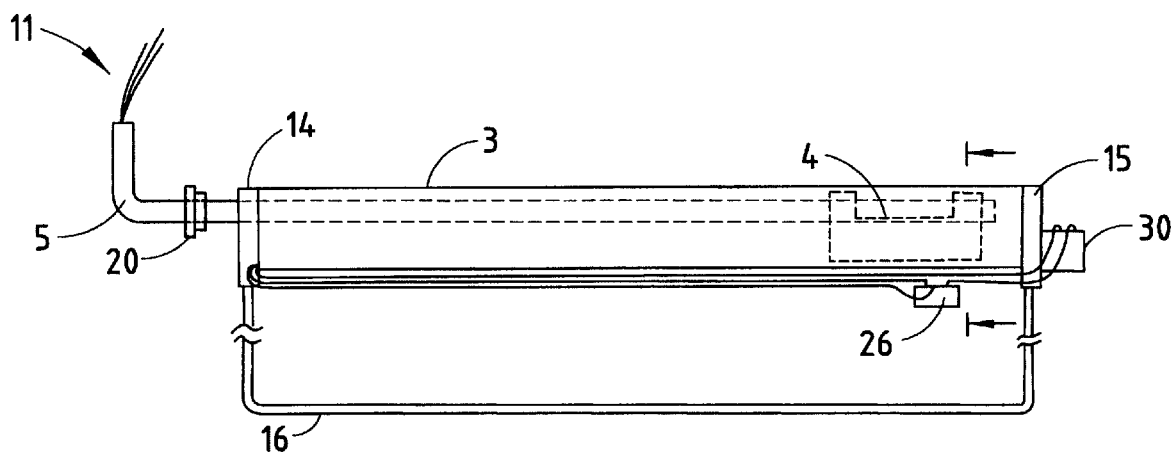
Figure 9:
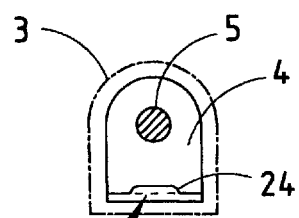

A line 11, needed to supply power to the illumination device (not shown) and the remote-control unit 10, comprises several conductor wires, for example, as illustrated in FIG. 4, three such conductor wires 17, 18, 19. During assembly, line 11 is first guided through the hollow axle 5 (FIG. 3) after which, upon the leg emerging from the short axle leg, there is clamped a plug element (not shown) for connection to the general electrical system of the vehicle. Upon the long axle leg, there was pushed beforehand a closure ring 20 and a plug 14 of the frame structure. The line is then guided through sliding body 4 that is engaged on the terminal area of the long axle leg of axle 5. Arranged on sliding body 4 is a switch 9 whose switching member 22 engages axle 5 and interrupts the circuit for the illumination unit, now shown, the moment—in the area of axle flattening 23—there occurs a physical contact. This physical contact exists, as a rule, when visor body 1 is in its resting position when it rests on the ceiling canopy. One of conductor wires 17–19, for example, conductor wire 19, is connected to switch 9 and is extended further (FIG. 4). Line 11 with conductor wires 17–19 is then returned (FIG. 5) through a cable duct 24 (FIG. 9) in sliding body 4 and then runs with loose windings 25 around axle 5 (FIG. 7) in order then again to come out of cavity 3 and terminal plug 14 so as to be returned again with a parallel course around cavity 3. The free ends of conductor wires 17–19 are connected to a microswitch 26 and via the latter as well as directly upon a coupling element 30 fixed upon frame structure 16 for the remote-control unit 10 (FIG. 8). The microswitch is provided when the body of the visor is equipped with a mirror 27 and a mirror cover slide 28 that cooperates with the microswitch 26.

The structural assembly according to FIG. 8 is inserted in a half of the body of the visor 12 as shown FIG. 2 and is covered by the second half of visor body 13, which can be connected with the first one via a film hinge. Visor body halves 12, 13 can be glued together or can be affixed upon each other in some other way. The fixing of the halves of the visor can also be accomplished by means of decorator material 29 with which a visor flank is usually enveloped.

After the enveloping, the closure ring 20 is clipped into terminal plug 14, guaranteeing a clean closure.

By shifting visor body 1 along the long leg of axle 5, power supply for the remote-control unit 10 is always maintained and, due to the loose windings 25, there is sufficient reserve material available for line 11. The new visor can thus be folded, swung and shifted and is furthermore equipped with a power supply that in any position of the visor body 1 guarantees power supply to the remote control unit. Provision is also made for switching an illumination unit that is effective when a slide lid position is open.

What is claimed is:

1. A visor for vehicles, comprising:
   a visor body having a tube-shaped opening extending along an edge thereof;
   a sliding member slidably positioned in said tube-shaped opening;
   a hollow pivot axle receiving said sliding member such that said visor body can slide along said hollow axle for adjustment to different sun-blocking positions;
   a plurality of conductors for coupling to the vehicle's electrical supply, said conductors extending through said hollow axle and including a first conductor coupled to a first switch;
   an illuminated vanity mirror having a source of illumination and a sliding cover positioned to actuate said first switch for providing electrical power from said first conductor to said source of illumination; and
   a remote control unit mounted to said visor body, wherein said plurality of conductors includes a second conductor coupled to the vehicle's electrical supply and to said remote control unit such that said.-remote control unit receives electrical power from the vehicle's electrical system regardless of the position of the visor or the sliding cover of said illuminated vanity mirror.

2. The visor as defined in claim 1, wherein said plurality of conductors have a surplus length that corresponds to the maximum shifting distance of said visor body on said axle.

3. The visor as defined in claim 2, wherein the surplus length of line is housed within said tub-shaped opening of said visor body.

4. The visor as defined in claim 3, wherein said conductors, which extend through said axle, are returned within said tube-shaped opening around said axle.

5. The visor as defined in claim 4, wherein said conductors returned in said tube-shaped opening are coiled.

6. The visor as defined in claim 5, wherein said axle, sliding member, conductors, and switches are a preassembled structural subassembly, and further including a frame structure coupled to said visor body to stiffen said visor body.

7. The visor as defined in claim 6, wherein said tube-shaped opening includes plugs that engage the ends of said opening.

8. The visor as defined in claim 1 and further including a second switch coupled to said first conductor and positioned within said tube-shaped opening to engage said axle to be actuated to provide power to said first switch for allowing the actuation of said illuminated vanity mirror only when said visor body is in a predetermined position along said axle.

* * * * *